April 14, 1936.  A. F. SEXTON  2,037,545

MANUFACTURE OF CONCRETE BLOCKS AND THE LIKE

Filed April 12, 1932   3 Sheets-Sheet 1

Inventor:
Arthur Francis Sexton
By his Attorney: Walter Gunn

April 14, 1936. A. F. SEXTON 2,037,545
MANUFACTURE OF CONCRETE BLOCKS AND THE LIKE
Filed April 12, 1932 3 Sheets-Sheet 2

Inventor:
Arthur Francis Sexton
By his Attorney: Walter Gunn

April 14, 1936.   A. F. SEXTON   2,037,545
MANUFACTURE OF CONCRETE BLOCKS AND THE LIKE
Filed April 12, 1932   3 Sheets-Sheet 3

Inventor:
Arthur Francis Sexton
By his Attorney: Walter Gunn

Patented Apr. 14, 1936

2,037,545

UNITED STATES PATENT OFFICE 2,037,545

MANUFACTURE OF CONCRETE BLOCKS AND THE LIKE

Arthur Francis Sexton, Ashton-under-Lyne, England, assignor to Universal Rubber Paviors Limited, Audenshaw, near Manchester, England Application April 12, 1932, Serial No. 604,739
In Great Britain April 21, 1931

2 Claims. (Cl. 25—122)

This invention refers to concrete blocks, and the like for receiving a rubber or other cap or facing, the block having dovetail or like anchoring recesses on its face which hold the cap or facing.

The invention applies particularly to rubber faced paving blocks. Heretofore, it has been proposed in rubber faced paving blocks by one method to preform the rubber cap and mould the base block to the cap, or by another method to preform the base block, forming the undercut recesses by means of an expanding ram and subsequently to mould the rubber cap to it. The second method has the advantage that because the base block is of a porous nature the rubber conforms with the surface of the block, entering the pores or surface crevices thereof, and effecting a perfect union.

By the first method, moulding the concrete on to the preformed rubber cap, the same degree of union is not obtainable.

The second method has hitherto been found to be unsuitable for concrete, as, in the precasting of the concrete, difficulties arise in forming the recesses, the concrete clinging to the ram, or otherwise losing its shape. Up to the present, in fact, there is not a satisfactory method of forming a preformed concrete block, having the required recesses. On the other hand, although the required recesses may be formed in brick bases by means of an expanding ram, brick bases have the disadvantage that they distort and shrink unevenly in the process of kilning.

One object of the invention is an improved process for the manufacture of rubber-capped concrete blocks.

Another object of the invention is improved apparatus for use in the manufacture of rubber-capped concrete blocks by the improved process.

According to the invention, the formation of the anchoring recesses in the concrete base block is effected by a moulding process in which a preformed rubber negative with soft and elastic rubber projecting die parts, or a rubber negative with soft detachable projecting rubber die parts, is used, the concrete being moulded directly on to the rubber negative under pressure. The negative is cap-like and constitutes the mould for shaping the surface of the block as well as for shaping the undercut recesses therein, and the body of the negative may be of like flexible and elastic rubber as the projections for forming the recesses.

After the concrete has set hard, the soft rubber negative or its soft rubber parts, is or are, removed or stripped from the concrete block, this being easily effected by reason of the elastic nature of the soft rubber. The modified form of sectional die, employing elastic rubber detachable parts, allows of the use of an elastic negative to be applied in the production of extremely acute undercut recesses, for example, such recesses as would exceed the capacity of elasticity of a single piece rubber negative and thus render the negative or the concrete block liable to damage in removal.

After removal of the negative the concrete block is placed in a rubber vulcanizing mould and the usual rubber cap proper applied and vulcanized directly on to the face of the block having the undercut recesses, the rubber and concrete thus becoming both perfectly united.

The soft rubber negative is used over and over again in the formation of the recesses in succeeding concrete blocks.

In the accompanying drawings:

Fig. 1 is a side or edge view, and

Fig. 2 an inverted plan of one example of preformed soft rubber negative used in carrying out the invention.

Figure 1:
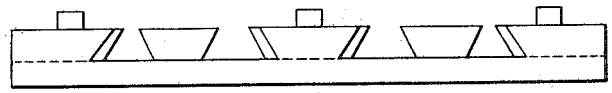
Figure 2:
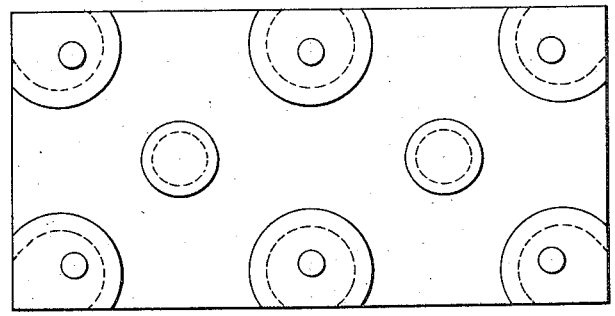

In Figs. 1 and 2, the soft rubber negative consists of a slab of rubber $a$ similar in shape and proportions in plan to the intended concrete block. Such slab is provided on one face with corner projections or die parts $b$, $b$ and edge projections or die parts $c$, $c$ also central island projections or die parts $d$, $d$. The curved sides of the die parts $b$, $b$ and $c$, $c$ are inclined and therefore give a dovetail shape to the die part on such faces, see Fig. 1. The die parts $d$, $d$ are inclined on all sides.

Figure 9:
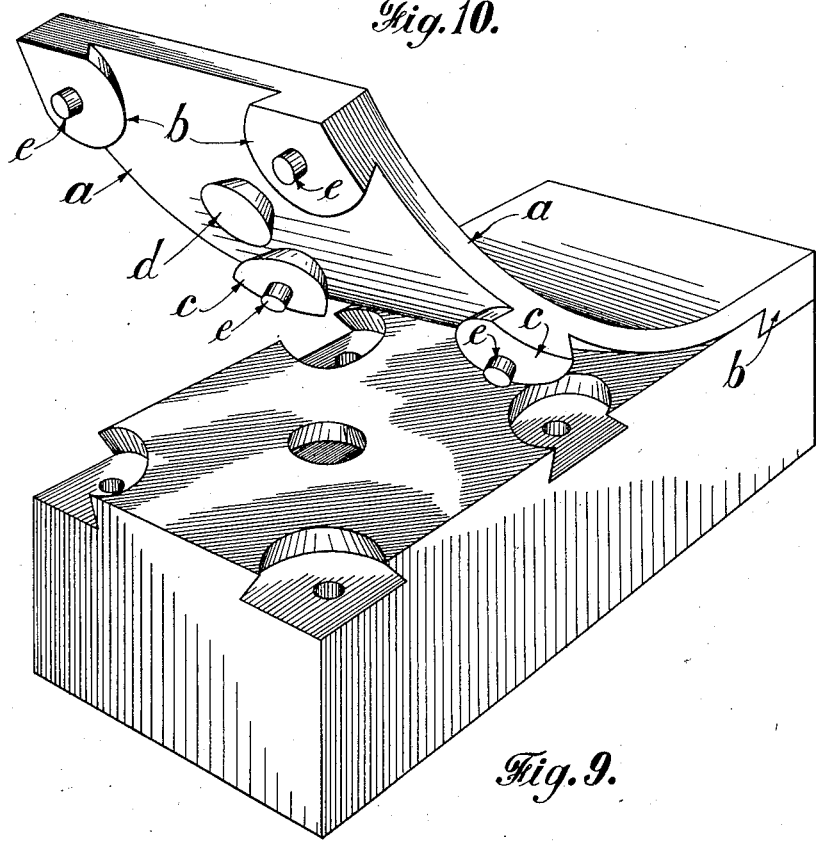
Fig. 9 is a perspective view of a concrete block after withdrawal from the mould shown in Fig. 5, and with the preformed cap-like soft rubber negative partly removed from the block.

All the die parts are made of comparatively soft rubber, so that while sufficiently firm to maintain their shape, they are capable of being extended or compressed or contracted transversely on requiring to be drawn out of a recess in which they may be moulded. As shown in Fig. 9, the soft rubber negative may be pulled away from the block, the die parts being of sufficient elasticity to allow of their being extended or deformed under tension to pull them out of the recesses in the block. The angle of the dovetail will usually be 45° to 60°.

Figure 3:
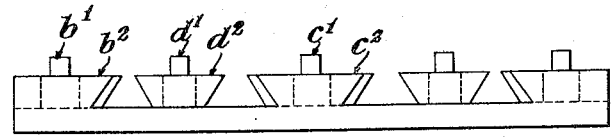
Fig. 3 is a side or edge view.
Figure 4:
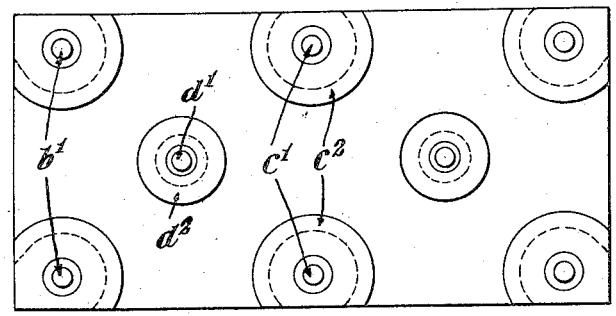
Fig. 4 is an inverted plan of another example of the preformed soft rubber negative.
Figure 5:
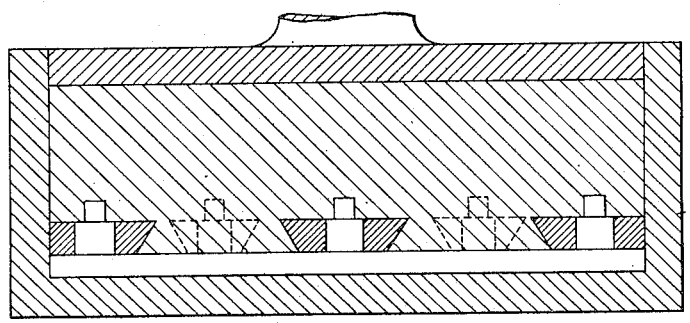
Fig. 5 is a sectional elevation of a moulding box on the floor of which is shown placed the preformed cap-like soft rubber negative (Figs. 3 and 4) with its dovetail shaped die parts lying uppermost, and in which moulding box the concrete block is moulded, under pressure, directly on to the negative.

In Figs. 3 and 4 the die parts of the soft-rubber negative are each in two portions $b^1$, $b^2$, $c^1$, $c^2$, $d^1$, $d^2$, the portions $b^1$, $c^1$, $d^1$ being parallel-sided and in one with the slab of the negative, and the portions $b^2$, $c^2$, $d^2$ being in the form of a detachable ring having a parallel-sided bore and an outer conical formation, the latter corresponding to the desired shape of undercut recess to be formed in the concrete block.

In forming the desired recesses in the concrete block by means of the soft-rubber negative with detachable die parts as shown in Figs. 3 and 4, the negative is placed, die parts upwards, on the floor of the moulding box in which the concrete block is to be moulded. The concrete, as a wet but crumbly mixture, is then placed in the box, to the required level, after which it is subjected to pressure or tamping by a ram $f$ for the purpose of consolidation, and for the purpose of pressing it into intimate contact and engagement with the rubber negative. The concrete thereby becomes intermoulded with the die parts of the rubber negative, and the block and rubber negative can then be removed from the moulding box as one.

Figure 6:
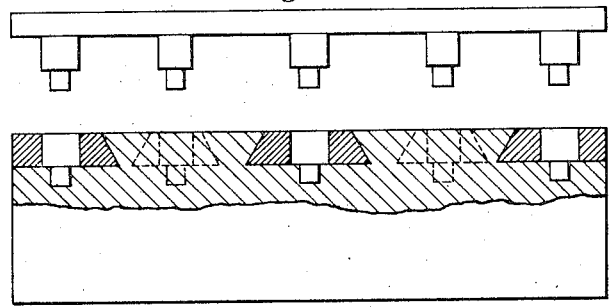
Fig. 6 is a part sectional side view of the concrete block right way up after removal from the moulding box, and a side view of the major portion of the cap-like soft rubber negative removed from the block, the detachable die parts of the negative remaining in the block.
Figure 7:
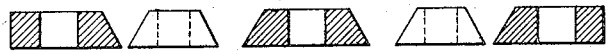
Fig. 7 is a side view of the concrete block after removing the detachable parts of the negative left in the block.
Figure 7:
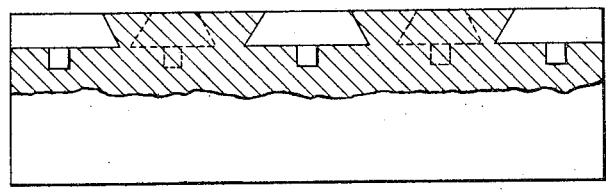
Figure 8:
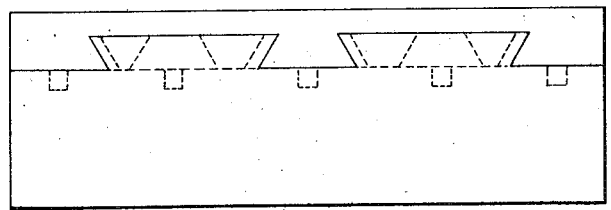
Fig. 8 is a side view of the concrete block having the recesses formed on it, and of a tough rubber facing or cap moulded directly on to the block.

After sufficient setting of the concrete block, the slab portion of the rubber negative is drawn away from the block, leaving the ring portions $b^2$, $c^2$, $d^2$ of the die parts in the block, see Fig. 6. The ring portions are removed from the block when the concrete is sufficiently set, which is easily done by reason of the soft elastic nature of the ring portions. In this way, very accurately shaped dovetail or other undercut recesses are formed in the concrete block, no portion of the concrete being disturbed with the removal of the die parts of the negative.

To receive the usual hard rubber facing or cap, the concrete block is then placed in a rubber vulcanizing mould or frame and the facing or cap moulded and vulcanized directly on to the recessed face of the block, the direct moulding and vulcanizing operation resulting in a very close and intimate connection between the rubber and concrete, in that the rubber enters the pores or surface crevices of the concrete, and the concrete interlocks with the rubber. In this part of the process steam is preferably employed for providing the heat for vulcanization, and the mould is also preferably so constructed that the steam has access to the block. Pressure is applied to force the rubber into the recesses and into the pores of the concrete block. The admission of live steam to the block during the process serves to give the block additional maturity simultaneously with heating it to receive and vulcanize on the rubber cap.

In the case of the detachable die parts, the angle of dovetail may be greater than that of the non-detachable die parts, owing to the ring portions $b^2$, $c^2$, $d^2$ being easy to remove from the concrete after the portions $b^1$, $c^1$, $d^1$ are withdrawn.

Figure 10:
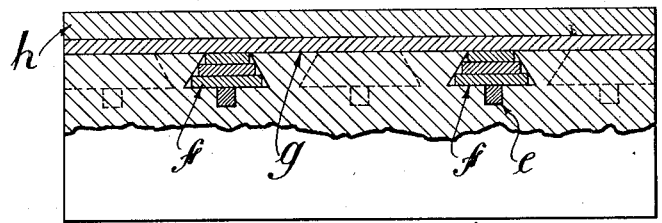
Fig. 10 is a sectional view showing the preferred manner of applying the rubber cap to the block.

As shown in Fig. 10, the rubber cap is applied to the block by building it up of several layers of rubber.

The drawings show three discs $f$ of rubber inserted in each of the undercut recesses, the discs being of different dimensions so as to fill as nearly as practicable the said recesses. On top of the block is then placed two sheets of rubber, the rubber of the lower and thinner sheet $g$ being similar to that of the discs $f$ used in the recesses, and adapted to set hard on vulcanization, while the upper sheet of rubber $h$, which ultimately forms the wearing surface or tread of the block, is of a rubber which will be suitably tough but resilient when vulcanized.

There may be more than two die parts $d$, $d$ or such die parts may be omitted. The surface of the slab $a$ may be formed with narrow ridges arranged to any desired pattern in plan, whereby the concrete will receive a like grooved pattern when moulded in close contact with such surface, the grooving helping finally in the more intimate moulding of the hard rubber cap with the finished concrete block.

Some or all the projections on the negative may have further projections or pips $e$ to form sinkings in the floor of the recesses in the block.

The invention will be applicable to large paving blocks as well as to blocks of ordinary size.

The invention is not limited to the foregoing examples of die parts of the rubber negative, since the same can be varied to suit other shapes and arrangements of recesses in the concrete block.

In the expression "concrete" is included any concrete composition of aggregate and cement, or aggregate and bitumen.

What I claim is:—

1. Apparatus for the manufacture of a concrete block with a vulcanized rubber cap, comprising a cap-like rubber negative for use in preforming the block having solid recess-forming elastic segmental projections rising from a base which shapes the upper face of the block, said negative being adapted to be stripped off the concrete block after the latter has set hard.

2. Apparatus for the manufacture of a concrete block with a vulcanized rubber cap, comprising a cap-like rubber negative having detachable recess-forming dovetail projections normally attached to and rising from a base which shapes the upper face of the block, which detachable projections are adapted to remain in the concrete when the body part of the negative is taken off, and to be taken out separately thereafter.

ARTHUR FRANCIS SEXTON.